(12) United States Patent
Schelstraete

(10) Patent No.: US 6,819,719 B2
(45) Date of Patent: Nov. 16, 2004

(54) METHOD TO TRANSFER TRELLIS CODE MODULATED DIGITAL DATA OVER A DIGITAL SUBSCRIBER LINE, AND RELATED MODULATOR AND DEMODULATOR DEVICES

(75) Inventor: Sigurd Jan Maria Schelstraete, Schoten (BE)

(73) Assignee: Alcatel, Paris (FR)

(*) Notice: Subject to any disclaimer, the term of this patent is extended or adjusted under 35 U.S.C. 154(b) by 593 days.

(21) Appl. No.: 09/785,494

(22) Filed: Feb. 20, 2001

(65) Prior Publication Data
US 2001/0017900 A1 Aug. 30, 2001

(30) Foreign Application Priority Data
Feb. 24, 2000 (EP) ............................................. 00400505

(51) Int. Cl.[7] ........................ H04L 23/02; H04Q 7/00; H04Q 11/04
(52) U.S. Cl. ...................... 375/262; 370/259; 370/271; 370/313; 370/314
(58) Field of Search .................................. 375/262, 265; 370/259, 271, 313, 314

(56) References Cited

U.S. PATENT DOCUMENTS 5,541,964 A    7/1996  Cohen et al.
6,088,386 A *  7/2000  Spruyt et al. ................ 375/222
6,236,685 B1 * 5/2001  Oppedahl .................... 375/265

FOREIGN PATENT DOCUMENTS

| EP | 0 949 784 A2 | 10/1999 | |
| EP | 0 961 515 A1 | * 12/1999 | ........... H04Q/11/04 |
| WO | WO 00/03552 | * 1/2000 | ............ H04Q/7/00 |

* cited by examiner

*Primary Examiner*—Stephen Chin
*Assistant Examiner*—Cicely Ware
(74) *Attorney, Agent, or Firm*—Sughrue Mion, PLLC

(57) ABSTRACT

A method to transfer data from a digital data modulator device to a digital data demodulator device over a subscriber line. The digital data modulator device has a detection circuit for detecting incoming idle ATM cells, and a cascade coupled null data cell generator, a trellis code modulator, a data encoder/mapper, a constellation points rotation circuit and a constellation points shifting circuit for shifting constellation points to lower power points. The digital data demodulator device has a detection circuit for detecting received null data, and a cascade coupled de-shifting circuit for shifting constellation points with the lowest power back to points corresponding to null data cells, a de-rotation circuit for de-rotating the constellation points, a data decoder/de-mapper and a trellis code de-modulator. Transmission power of idle data is minimized, and the random rotation of low power constellation points simplifies the training and tracking of the frequency equalizer in the demodulator.

13 Claims, 2 Drawing Sheets

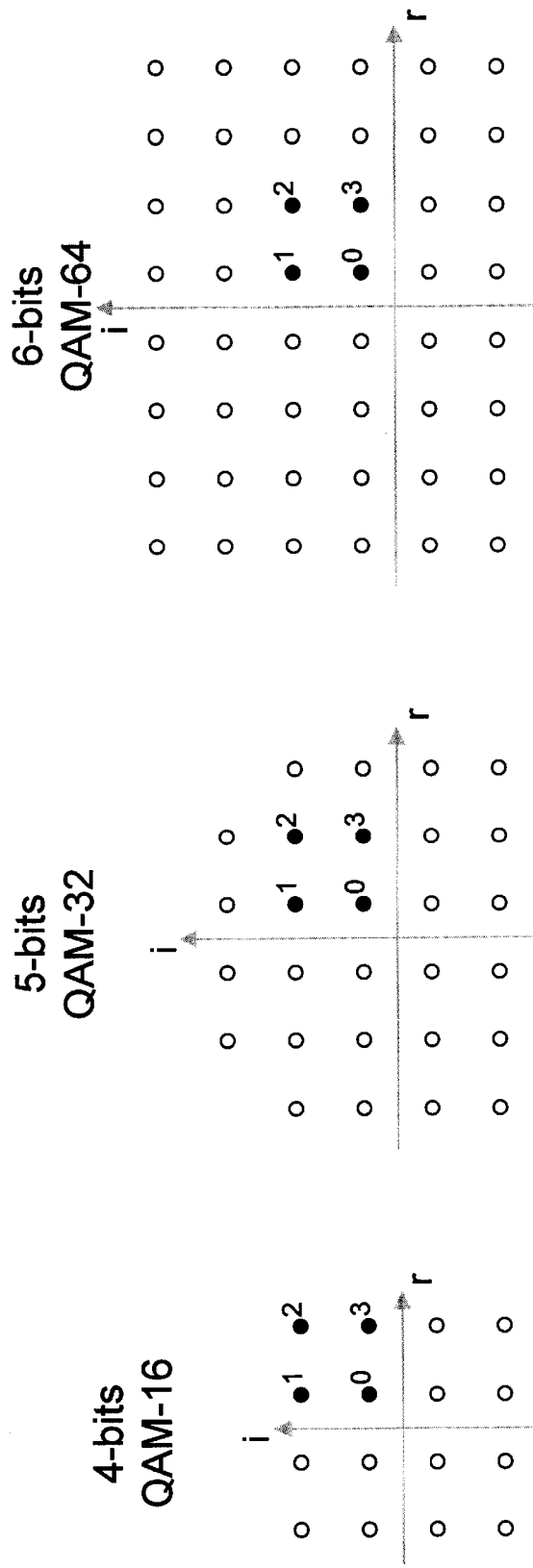
Fig. 2a  4-bits QAM-16
Fig. 2b  5-bits QAM-32
Fig. 2c  6-bits QAM-64
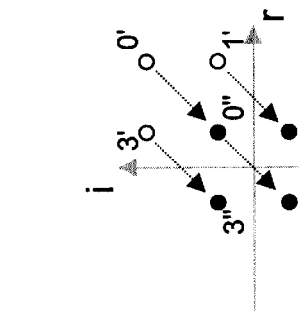
Fig. 3
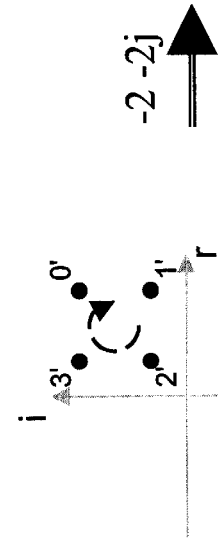
Fig. 4

1

METHOD TO TRANSFER TRELLIS CODE MODULATED DIGITAL DATA OVER A DIGITAL SUBSCRIBER LINE, AND RELATED MODULATOR AND DEMODULATOR DEVICES

BACKGROUND OF THE INVENTION

The present invention relates to a method to transfer data from a digital data modulator device to a digital data demodulator device over a digital subscriber line, said method includes, in said modulator device, the steps of modulating incoming groups of data bits into data symbols according to the trellis code modulation technique and of mapping said data symbols on carriers associated to constellation points of a constellation scheme and, in said demodulator device, the steps of de-mapping received carriers into data symbols and of de-modulating said data symbols into groups of data bits according to the trellis code de-modulation technique.

Such a method to transfer digital data is generally known in the art and may for instance be derived from the "*DRAFT STANDARD*" of ANSI "T1.413-1998 Issue 2" entitled "*Network and Customer Installation Interfaces— Asymmetric Digital Subscriber Line (ADSL) Metallic Interface*" of the "COMMITTEE T1—TELECOMMUNICATIONS— Working Group T1E1.4 T1E1.4/98-007R5, Plano, Tex.; Nov. 30–Dec. 7, 1998". The invention more particularly relates to such a method used in an ADSL [Asymmetric Digital Subscriber Line] modem or any higher version thereof such as a VDSL [Very High Speed Digital Subscriber Line] modem which transfers ATM [Asynchronous Transfer Mode] cells over a ADSLNDSL network segment as mentioned in the "*Nortel standard contribution*" entitled "On the ATM TC for VDSL" from the author L. D. Humphrey. This standard contribution with reference "*TD44 Antwerp*" was presented on the meeting of 20–24'th April 1998 in Antwerp of ETSI's Sub-Technical Committee TM6.

In case idle or unused ATM cells are supplied to the modem, this modem replaces the idle ATM cells with null ATM cells, i.e. cells whose header and payload sections are completely filled with zero bytes, whilst these of the idle ATM cells not always are. The modem further associates with null data symbols corresponding to the null ATM cells the origin point of a constellation diagram used to modulate carrier(s). In this way, transmitted power is reduced to a minimum during transfer of idle ATM cells and FEXT [Far End CrossTalk] is significantly reduced.

If however a relatively long sequence of idle ATM cells is transferred as a sequence of origin points of the constellation diagram, detection at the demodulator becomes difficult because of the powerless property of the origin point of the constellation diagram. In the known method, eight subsequent carriers are summed to perform the detection. Moreover, training and tracking of the Frequency EQualizer [FEQ] of the demodulator is hampered if a sequence of powerless data symbols arrives there, as a consequence of which the known modulation technique is not suitable for use in modems equipped with an adaptive FEQ whose taps are adjusted on the basis of information in the received data symbols, such as a DMT [Discrete Multi Tone] modem used in an ADSL [Asymmetric Digital Subscriber Line] or in a VDSL [Very High Speed Digital Subscriber Line] environment.

Additionally, in case the trellis code modulation is used, the correction bit(s) inserted thereby leads to create data symbols that are not always null, even for null ATM cells. Carriers associated to data symbols derived from null ATM cells can however be represented by four constellation points located in the first quadrant of the constellation diagram. Consequently, the transmission power may be relatively high during the transmission of idle ATM cells on the digital subscriber or telephone line.

SUMMARY OF THE INVENTION

An object of the present invention is to provide a method of the above known type but wherein, during the transfer of idle data over the digital subscriber line, the power consumption is minimized.

According to the invention, this object is achieved due to the fact that said method further includes, in said modulator device, the step of detecting incoming idle data, and in case idle data are detected, the step of generating null data cells derived from said idle data, and, after said steps of modulating and of mapping, the step of shifting constellation points corresponding to said null data cells towards constellation points having a relatively lower power, and in said demodulator device, the step of detecting received null data, and in case null data are detected, the step of de-shifting constellation points having the relatively lowest power towards constellation points corresponding to null data cells, prior to said steps of de-mapping and of de-modulating.

The QAM [Quadrature Amplitude Modulation] constellation points having the lowest power are the four points located each in a distinct quadrant and nearest to the origin of the constellation diagram. In this way, by associating a low power constellation point with idle data, the transmitted power is minimized during idle data transmission but no zero power points are transmitted so that it is no longer necessary to sum eight successive carriers to enable detection as mentioned above. The training and tracking of the frequency equalizer in the demodulator device is thereby simplified.

Another characterizing embodiment of the present invention is that said method further includes in said modulator device the step of randomly rotating constellation points corresponding to said null data cells amongst each other, and in said demodulator device the step of randomly de-rotating constellation points to obtain constellation points corresponding to null data cells.

Without rotating the constellation points, null data will always be mapped on the same position in the constellation diagram. By randomly rotating the constellation points of lowest power around the origin of the constellation diagram, the FEQ training and tracking is improved without increasing the transmitted power. Moreover, it is avoided that all idle data cells are represented by in-phase carriers, which would otherwise result in a high crest factor in multi-carrier systems. In other words, the Peak-to-Average Ratio [PAR] value is reduced and the FEQ updating is no longer disturbed by a constant interferer.

In a preferred embodiment, the method of the present invention is further characterized in that said constellation points are randomly rotated and randomly de-rotated over an integer multiple of 90 degrees.

It is to be noted that in the method of the present invention, the constellation points may either be shifted and then rotated or first be rotated and then shifted. In the first case, the constellation points are rotated around the origin of the constellation diagram.

The present invention also relates to a digital data modulator device and to a digital data demodulator device adapted to use the above-described method.

The digital data modulator device of the present invention comprises a trellis code modulator adapted to modulate incoming groups of data bits into data symbols according to the trellis code modulation technique, and a data encoder adapted to map said data symbols on carriers associated to constellation points of a constellation scheme.

According to the invention, the modulator device further comprises detection means adapted to detect incoming idle data, null data cell generation means adapted to generate null data cells as derived from said idle data and coupled to an input of said trellis code modulator, constellation points shifting means coupled to an output of said data encoder and adapted to move constellation points corresponding to said null data cells towards constellation points having a relatively lower power, and control means adapted to control the operation of said null data cell generation means and of said shifting means upon detection of idle data by said detection means.

In a preferred embodiment of the invention, the digital data modulator device is characterized in that it further comprises constellation points rotation means adapted to rotate amongst each other constellation points corresponding to said null data cells, the operation of said rotation means being also controlled by said control means.

On the other hand, the digital data demodulator device of the present invention comprises a data decoder adapted to translate received carriers into data symbols, and a trellis code de-modulator adapted to demodulate said data symbols into groups of data bits according to the trellis code de-modulation technique.

According to the invention, the demodulator device further comprises detection means adapted to detect received null data, constellation points de-shifting means adapted to move constellation points having the relatively lowest power towards constellation points corresponding to null data cells, and control means adapted to control the operation of said shifting means upon detection of received null data by said detection means, said constellation points de-shifting means being coupled between an input of said demodulator device and an input of said data decoder.

In a preferred embodiment of the invention, the digital data demodulator device is characterized in that it further comprises constellation points de-rotation means adapted to rotate amongst each other constellation points corresponding to null data cells, the operation of said rotation means being also controlled by said control means.

Further characterizing embodiments of the present method, modulator and demodulator devices are mentioned in the appended claims.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein:

FIGS. 2a to 2c represent different constellation diagrams corresponding to 4-bits, 5-bits and 6-bits data symbols respectively used in the modulator MOD and demodulator DMOD devices of FIG. 1;

FIG. 3 represents changes in the constellation diagram of the previous figures by pseudo-random rotation of constellation points according to the invention; and FIG. 4 represents changes in the constellation diagram of the previous figures by shifting constellation points in order to achieve the method of the invention.

DETAILED DESCRIPTION OF THE INVENTION

Figure 1:
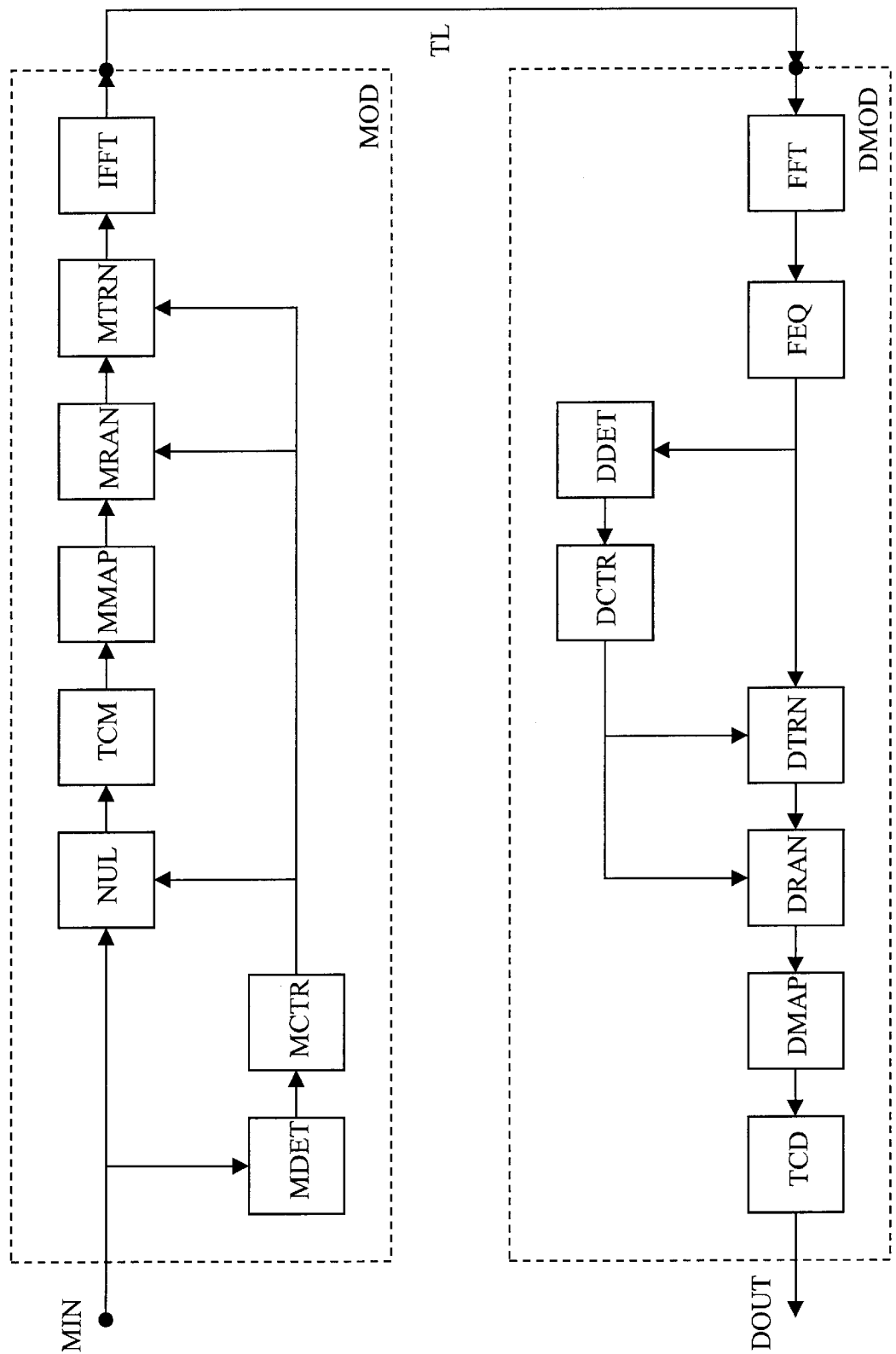
FIG. 1 represents a block scheme of embodiments of a digital data modulator device MOD and digital data demodulator device DMOD according to the present invention.

In FIG. 1, a digital data modulator device MOD is coupled via a digital subscriber line TL to a digital data demodulator device DMOD. The telephone line TL may support one-way communication, i.e. data traffic from the modulator MOD to the demodulator DMOD, or it may be a bi-directional link allowing communication in both directions. In the latter situation, however, the modulator MOD and demodulator DMOD form part of two communicating modems which each include the functionality of both the modulator MOD and the demodulator DMOD shown. This is for instance so in an ADSL [Asymmetric Digital Subscriber Line] or in a VDSL [Very High Speed Digital Subscriber Line] system.

The modulator MOD has an input terminal MIN at which ATM [Asynchronous Transfer Mode] cells are received and to which is connected a detection circuit MDET for detecting incoming idle or unused ATM cells. The modulator MOD also comprises a null data cell generator NUL, a trellis code modulator TCM, a data encoder or mapper MMAP, a constellation points rotation circuit MRAN, a constellation points shifting circuit MTRN and an inverse fast Fourier transformer IFFT cascade connected between the input MIN and an output of MOD connected to the digital subscriber line or telephone line TL. The modulator MOD further comprises a control circuit MCTR coupled to an output of the detection circuit MDET and adapted to control the operation of the null data cell generator NUL, the rotation circuit MRAN and the shifting circuit MTRN upon detection of idle ATM cells by MDET.

The demodulator DMOD has an input connected to the telephone line TL and an output DOUT at which ATM cells are provided. The demodulator DMOD comprises, between its input and output DOUT, the cascade connection of a fast Fourier transformer FFT, a constellation points de-shifting circuit DTRN, a constellation points de-rotation circuit DRAN, a data decoder or de-mapper DMAP and a trellis code de-modulator TCD. The demodulator DMOD further comprises a detection circuit DDET coupled between the fast Fourier transformer FFT and the de-shifting circuit DTRN and adapted to detect null data received from the telephone line TL. An output of the detection circuit DDET is connected to a control circuit DCTR adapted to control the operation of the de-shifting circuit DTRN and the de-rotation circuit DRAN.

In the following paragraphs, the working of the modulator MOD and demodulator DMOD of FIG. 1 will be described in case non-idle data are to be transferred there between and in case idle data are to be transferred there between. It is assumed that the modulator MOD is a DMT [Discrete Multi Tone] modulator, that the demodulator DMOD is a DMT demodulator, and that both are used in a ADSL or VDSL system. A system including the modulator MOD and the demodulator DMOD is a multi-carrier system wherein the incoming bits of data are arranged in groups from which are derived data symbols that are modulated on different carriers in accordance with different constellation schemes. The amount of bits in each group and thus in each data symbol modulated on a carrier will depend on the SNR [Signal-to-Noise ratio] measured on the telephone line TL at the frequency of that carrier. Each data symbol corresponds to a constellation point in a constellation diagram. Possible constellation points for different carriers corresponding to 4-bits, 5-bits and 6-bits data symbols are represented by dots in the FIGS. 2a, 2b and 2c respectively. The QAM [Quadrature Amplitude Modulation] is the most used modulation scheme. A 4-bits data symbol leads for instance to a QAM-16 modulation scheme, a 5-bits data symbol to QAM-32 and a 6-bits data symbol to QAM-64. More generally, a n-bits data symbol leads to a QAM-$2^n$ modulation scheme, where $2^n$ indicates the number of possible constellation points that may represent a data symbol. A constellation diagram has real horizontal axis r and an imaginary vertical axis i, and the constellation points are equally distributed in the four quadrants around these axis. It is to be noted that the distance between the points forming a constellation diagram decreases when the number of bits in the constellation increases. Also the transmission power corresponding to points located near to the origin of the diagram is relatively lower than the transmission power of points located further away from this origin. It is also to be noted that the constellation point 0 located near to the origin has a binary value 0000, 00000 and 000000 at the FIGS. 2a, 2b and 2c respectively, the coordinates of this point 0 is +1 +j.

At the input MIN of the modulator MOD, ATM cells arrive that have to be transferred over the ADSL or VDSL network segment or telephone line TL between the modulator MOD and demodulator DMOD.

If non-idle ATM cells arrive at the input MIN, the detection circuit MDET controls accordingly the control circuit MCTR to deactivate the operation of the null data cell generator NUL, the rotation circuit MRAN and the shifting circuit MTRN. These circuits are then seen as transparent for the non-idle incoming ATM cells. The incoming stream of data is arranged in groups of data bits as explained above and these groups are applied to the trellis code modulator TCM that will perform a trellis code modulation thereon.

In more detail, a QAM modulation scheme is chosen in function of different parameters such as for instance the noise on the telephone line TL. If, for instance, groups of n=2 data bits are chosen according to these parameters, the trellis code modulation performed by the trellis code modulator TCM consists in using a higher constellation scheme than QAM-4. In more detail, the n data bits are divided in two sub-groups k1 and k2 so that n=k1+k2, and of which only k2 will be coded with m additional bits, where m may be 1 or more, say m=1 in the present example. This leads to a QAM-8 constellation that may be sub-divided into arrays, called "cosets", each array being a k1 bits=1 bit constellation. From the n=k1+k2=2 bits, k2+m=2 bits are used to indicate to which coset the k1=1 data bit belongs. The k2+m bits that indicate the coset result from coding k2 bits and allow a more reliable selection decision on the coset. In a first instance, by increasing the constellation scheme with m bits, the distance between the constellation points is reduced. However, by a suitable choice of the points belonging to each coset, this distance within a coset will be increased. The distance between points of a same coset may thus be larger than the distance between points of a "normal" constellation scheme with a same number of bits. The trellis code modulation allows thus to improve the coding gain while reducing the risk of transmission errors.

At the output of the trellis code modulator TCM, the n+m-bits data symbols are applied to the data encoder or mapper MMAP adapted to "map" these data symbols into points of a constellation diagram. The mapper MMAP allocates to each carrier of a DMT symbol of the multi-carrier system a data symbol. The phase and amplitude of the carriers are modulated by the mapper MMAP in accordance with the constellation scheme in order to associate with each data symbol a constellation point in the constellation diagram.

Once the phases and amplitudes of the carriers are modulated, the set of carriers constituting one DMT symbol is transformed from the frequency domain to the time domain by the inverse fast Fourier transformer IFFT. The time domain DMT symbol is then transferred over the telephone line TL to the demodulator DMOD.

In the demodulator DMOD, the fast Fourier transformer FFT transforms the time domain DMT symbol back into a frequency domain DMT symbol. The output of fast Fourier transformer FFT is coupled to a Frequency EQualizer FEQ used to compensate for the frequency dependent distortion due to the transmission. As such devices are well known by the skilled person in the art, they will not be described here in more detail.

The non-idle ATM cells received in the demodulator DMOD are detected by the detection circuit DDET which controls accordingly the control circuit DCTR to deactivate the operation of the de-shifting circuit DTRN and the de-rotation circuit DRAN. These circuits are then seen as transparent for the non-idle incoming cells.

The de-mapper DMAP uses the same constellation schemes as the mapper MMAP in the modulator MOD and extracts from the constellation points of each carrier the data symbol modulated thereon.

The trellis code de-modulator TCD transforms the data symbol received from the de-mapper DMAP into a group of n data bits by performing an operation opposite to that explained above for the trellis code modulator TCM. As a result, in the absence of noise an exact copy of the ATM cells which were applied to the input MIN of the modulator MOD appears at the output DOUT of the demodulator DMOD.

In case idle or unused ATM cells are applied to the input MIN of the modulator MOD, the detection circuit MDET recognizes these idle ATM cells and controls the control circuit MCTR to activate the operation of the null data cell generator NUL, the rotation circuit MRAN and the shifting circuit MTRN.

The null data cell generator NUL replaces the incoming idle ATM cells with null data cells, i.e. cells whose header and payload sections are completely filled with zero bytes, whilst these of the idle or unused ATM cells not always are.

This stream of zero bits is then subdivided into groups of n-bits according to the above described QAM modulation scheme. Each group of n-bits is then applied to the trellis code modulator TCM that creates a corresponding data symbol. The data symbols are applied to the mapper MMAP that modulates them on the different carriers in accordance with the respective constellation schemes.

It has now to be noted that the data symbols corresponding to groups of zero bits modulated according to the trellis code modulation technique by the trellis code modulator TCM are located in the first (upper right) quadrant of the constellation diagram, whatever the QAM modulation scheme used. The four possible data symbols representing modulated null data cells are represented by the black dots 0, 1, 2 and 3 in the 4-bits, 5-bits and 6-bits constellation diagrams of the FIGS. 2a, 2b and 2c respectively. These four points distinguish only by their 2 Least Significant Bits [LSB]. Amongst these four points, the constellation point with the lowest transmission power is the point 0 with coordinate +1 +j, on the r-axis and the i-axis respectively.

As an object of the invention is to reduce to a minimum the transmission power of idle cells, the idea is to shift the four points 0, 1, 2 and 3 from the first quadrant towards four points distributed around the origin of the constellation diagram, with one point in each quadrant. This operation is performed by the constellation points shifting circuit MTRN as shown at FIG. 4.

Moreover, the Frequency EQualizer (FEQ) of any ADSL or VDSL DMT receiver or demodulator has to be trained and, in case of a multi-carrier ADSLNDSL system, clipping due to a high crest factor may occur. The present invention adds to solve also this problem. Indeed, in order to simplify the training or update operation of the FEQ of the demodulator, the four points 0, 1, 2 and 3 are also randomly rotated over an integer multiple of 90 degrees. This operation is realized by the constellation points rotation circuit MRAN and results for instance in the points 0', 1', 2' and 3' as shown at FIG. 3. It is to be noted that rotating the constellation points 0, 1, 2 and 3 amongst each other consists in changing their 2 LSB's. The rotation also reduces the Peak-to-Average Ratio [PAR] of the transmission signal. Without rotating the data symbols, they should always be mapped on the same constellation point. By rotating them, the effect of constant interference on the FEQ is eliminated. In a preferred embodiment, the swap between normal and rotated constellation points may be performed after each symbol.

After the rotation operation by the circuit MRAN, constellation points shifting circuit MTRN moves the points 0', 1', 2' and 3' to the points 0", 1", 2" and 3", as mentioned above. This shifting is shown at FIG. 4 and is performed by adding the value −2 −2j to each of the points 0', 1', 2' and 3' of the constellation diagram.

The inverse fast Fourier transformer IFFT then again transforms the modulated carriers constituting one DMT symbol into a time domain DMT symbol that is transferred over the telephone line TL towards the demodulator DMOD.

It is to be noted that the modulator MOD shown at FIG. 1 represents only a preferred embodiment of the invention. The following order of the circuits MRAN and MTRN may for instance be inverted without affecting the object of the invention.

In the demodulator DMOD, the fast Fourier transformer FFT regenerates the frequency domain DMT symbols from the time domain DMT symbols.

The null data received in the demodulator DMOD are detected by the detection circuit DDET which controls accordingly the control circuit DCTR to activate the operation of the de-shifting circuit DTRN and the de-rotation circuit DRAN.

The constellation points de-shifting circuit DTRN moves back the constellation points 0", 1", 2" and 3" towards the points 0', 1', 2' and 3' by adding thereto the value −2 −2j. The constellation points are then back in the first quadrant of the constellation diagram as at the output of the constellation points rotation circuit MRAN of the modulator MOD.

The constellation points de-rotation circuit DRAN returns the randomly rotated points onto their former position by rotating these points by a same multiple of 90 degrees as done by the constellation points rotation circuit MRAN but in the opposite direction. Here again the operation only affects the 2 LSB's of the data symbols.

The data decoder or de-mapper DMAP operates according to the same constellation scheme as the mapper MMAP of the modulator MOD to extract a data symbol from each carrier received from the de-rotation circuit DRAN.

The trellis code de-modulator TCD performs the same operation as explained above with respect to non-idle cells. The data symbols are transformed in groups of data bits, corresponding to null data cells in this case. As a result, idle ATM cells are provided at the output DOUT of the demodulator DMOD.

It is to be noted that, although valid for any kind of modulation scheme, the embodiment of the present invention best works with 4-bits or higher modulation schemes, i.e. QAM-16 or more.

A first remark is that, although the multi-carrier signal in the above described embodiment is transported over a telephone line TL, the applicability of the present invention is not restricted by the transmission medium via which the signal is transported. In particular, transmission over any kind of connection between the modulator MOD and demodulator DMOD, e.g. a cable connection, a satellite connection, a radio link through the air, and so on, may be improved according to the present invention.

The invention also is not only related to ADSL [Asymmetric Digital Subscriber Line] or similar systems wherein DMT [Discrete Multi Tone] modulation is used. A person skilled in the art will be able to adapt the above described embodiment so that it is applicable in any other system wherein a single-carrier signal or multi-carrier signal is transmitted from a transmitting modem to a receiving modem.

Yet another remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

The modulator MOD and the demodulator DMOD may also include other functional blocks not shown in the figures. For instance, a known "Reed-Solomon" or other CRC error correction circuit may be used to improve the quality of the transmission and/or a scrambler may add a random sequence of bits to the bits of the non-idle incoming ATM cells to obtain a good statistic of the transmitted signal. Such additional circuits will however not affect the principle of operation of the method according to the invention.

It is finally also to be noted that the described method works with or without the Trellis Code Modulator TCM/de-Modulator TCD.

While the principles of the invention have been described above in connection with specific apparatus, it is to be clearly understood that this description is made only by way of example and not as a limitation on the scope of the invention, as defined in the appended claims.

What is claimed is:

1. A method to transfer data from a digital data modulator device to a digital data demodulator device over a digital subscriber line, said method comprising:

in said modulator device, the steps of modulating incoming groups of data bits into data symbols according to the trellis code modulation technique, and of mapping said data symbols on carriers associated to constellation points of a constellation scheme, and in said demodulator device, the steps of de-mapping received carriers into data symbols, and of de-modulating said data symbols into groups of data bits according to the trellis code de-modulation technique, wherein said method further comprises:

in said modulator device, the step of detecting incoming idle data, and if idle data is detected, the step of generating null data cells derived from said idle data, and, after said steps of modulating and of mapping, the step of shifting constellation points corresponding to said null data cells towards constellation points having a low power, and in said demodulator device, the step of detecting received null data, and if null data is detected, the step of de-shifting constellation points having low power towards constellation points corresponding to null data cells, prior to said steps of de-mapping and of de-modulating.

2. The method according to claim 1, wherein said method further comprises, in said modulator device, the step of randomly rotating constellation points corresponding to said null data cells amongst each other, and, in said demodulator device, the step of randomly de-rotating constellation points to obtain constellation points corresponding to null data cells.

3. The method according to claim 1, wherein said method further comprises:

in said modulator device, the step of detecting incoming idle data and if idle data is detected, the step of generating null data cells is performed prior to said step of modulating, whilst the step of shifting is performed after said step of mapping, and in said demodulator device the step of detecting received null data, and if null data is detected, the step of de-shifting is performed prior to said step of de-mapping.

4. The method according to claim 2, wherein said method further comprises:

in said modulator device, the step of randomly rotating is performed after the step of mapping and before the step of shifting, and in said demodulator device, the step of randomly de-rotating is performed after the step of de-shifting and before the step of de-mapping.

5. The method according to claim 2, wherein said constellation points are randomly rotated and randomly de-rotated over an integer multiple of 90 degrees.

6. The method according to claim 1, wherein said step of shifting constellation points corresponding to said null data cells towards constellation points having a low power comprises adding −2 −2j to said carriers, and said step of de-shifting constellation points having low the relatively lowest power towards constellation points corresponding to null data cells comprises adding +2 +2j to said carriers.

7. A digital data modulator device comprising:

a trellis code modulator adapted to modulate incoming groups of data bits into data symbols according to the trellis code modulation technique, a data encoder adapted to map said data symbols on carriers associated to constellation points of a constellation scheme, detection means adapted to detect incoming idle data, null data cell generation means adapted to generate null data cells as derived from said idle data and coupled to an input of said trellis code modulator, constellation points shifting means coupled to an output of said data encoder and adapted to move constellation points corresponding to said null data cells towards constellation points having a low power, and control means adapted to control the operation of said null data cell generation means and of said shifting means upon detection of idle data by said detection means, wherein said null data cell generation means, said trellis code modulator, said data encoder and said shifting means are coupled in cascade.

8. The digital data modulator device according to claim 4, wherein said modulator device further comprises constellation points rotation means adapted to rotate amongst each other constellation points corresponding to said null data cells, the operation of said rotation means being also controlled by said control means.

9. The digital data modulator device according to claim 8, wherein said constellation points rotation means rotate said constellation points corresponding to said null data cells by randomly modifying the 2 Least Significant Bits of the corresponding data symbols.

10. A digital data demodulator device comprising:

a data decoder adapted to translate received carriers into data symbols, and a trellis code de-modulator adapted to demodulate said data symbols into groups of data bits according to the trellis code de-modulation technique, detection means adapted to detect received null data, constellation points de-shifting means adapted to move constellation points having low power towards constellation points corresponding to null data cells, and control means adapted to control the operation of said shifting means upon detection of received null data by said detection means, said constellation points de-shifting means being coupled between an input of said demodulator device and an input of said data decoder.

11. A digital data demodulator device according to claim 10, wherein said demodulator device further comprises constellation points de-rotation means adapted to rotate amongst each other constellation points corresponding to null data cells, the operation of said rotation means being also controlled by said control means.

12. A digital data demodulator device according to claim 10, wherein said shifting means, said data decoder and said trellis code de-modulator are coupled in cascade.

13. A digital data demodulator device according to claim 11, wherein said constellation points de-rotation means rotate said constellation points corresponding to said null data cells by randomly modifying the 2 Least Significant Bits of the corresponding data symbols.

* * * * *